(12) United States Patent
Haegeman et al.

(10) Patent No.: US 7,744,679 B2
(45) Date of Patent: Jun. 29, 2010

(54) LIQUID—FOAM SYSTEM

(75) Inventors: Johny Hector Haegeman, Halle (BE); Bruno Poot, Zaventem (BE); Joseph Charpentier, Cesson-Sevigne (FR); Michel Durris, Messanger (FR)

(73) Assignees: Aquasystems International N.V., Halle (BE); OTV SA, Saint-Maurice Cedex (FR)

( * ) Notice: Subject to any disclaimer, the term of this patent is extended or adjusted under 35 U.S.C. 154(b) by 520 days.

(21) Appl. No.: 11/752,013

(22) Filed: May 22, 2007

(65) Prior Publication Data

US 2008/0314247 A1   Dec. 25, 2008

Related U.S. Application Data

(63) Continuation-in-part of application No. PCT/BE2005/000169, filed on Nov. 22, 2005.

(30) Foreign Application Priority Data

Nov. 22, 2004 (EP) ............................ 04447257.9

(51) Int. Cl.
  *B01D 19/00* (2006.01)
(52) U.S. Cl. ........................................ 95/242; 96/177
(58) Field of Classification Search ............... 95/242; 96/177, 178, 179, 180, 176
See application file for complete search history.

(56) References Cited

U.S. PATENT DOCUMENTS

| | | | |
|---|---|---|---|
| 3,163,508 A * | 12/1964 | Tuck et al. | 95/242 |
| 3,460,810 A | 8/1969 | Mueller | |
| 3,520,822 A * | 7/1970 | Traelnes | 96/177 |
| 4,290,885 A * | 9/1981 | Kwak | 210/197 |
| 6,460,830 B1 * | 10/2002 | Boulant | 261/36.1 |
| 2003/0183081 A1 * | 10/2003 | Gaus et al. | 95/242 |

FOREIGN PATENT DOCUMENTS

| | | |
|---|---|---|
| AT | 356018 | 4/1980 |
| CH | 478242 | 9/1969 |
| CH | 613383 | 9/1979 |

(Continued)

OTHER PUBLICATIONS

Aquasystems International NV Aqua Turbo Submersible Aerator Series AER-SB and Series AER-SB/L Leaflet Published prior to Jan. 2003 (2 pages).

(Continued)

*Primary Examiner*—Duane Smith
*Assistant Examiner*—Douglas J Theisen
(74) *Attorney, Agent, or Firm*—Hovey Williams LLP

(57) ABSTRACT

A liquid foam system and process for treating an aqueous medium volume includes foam breaking equipment for treating foam floating on a liquid medium. The foam breaking equipment includes a foam conveyer, a rotatable driven screw for sucking foam present in the foam conveyor and for causing at least a partial defoaming of the foam and for expelling foam out of the foam conveyor, and an exhaust gas tube for removing gas within the foam conveyor released from the foam during defoaming. The foam breaking equipment may be used in conjunction with a first tank having a liquid medium and the process includes conveying foam downwardly into the foam conveyor and at least partially defoaming the conveyed foam.

54 Claims, 10 Drawing Sheets

FOREIGN PATENT DOCUMENTS

| | | |
|---|---|---|
| CN | 10090050 C | 9/2002 |
| FR | 2798602 | 3/2001 |
| FR | 2860168 | 4/2005 |

OTHER PUBLICATIONS

Aquasystems International NV Aqua Turbo Floating Surface Aerator Series AER-AS Leaflet Published prior to Jan. 2003 (2 pages).

Aquasystems International NV Aqua Turbo Submersible Aerator Series AER-SL Leaflet Published prior to Jan. 2003 (2 pages).

Aquasystems International NV Aqua Turbo Aerators—Mixers—Decanters Leaflet Published prior to Jan. 2003 (6 pages).

* cited by examiner

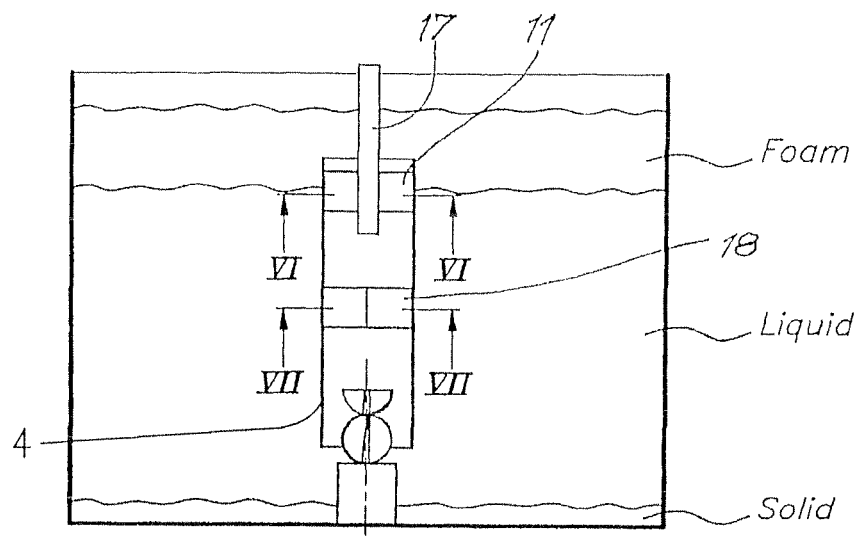
Fig.5
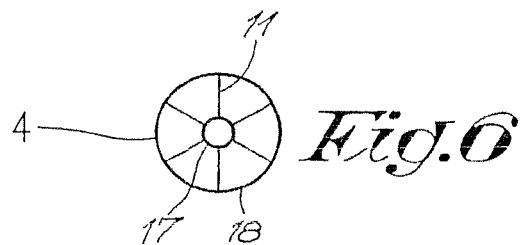
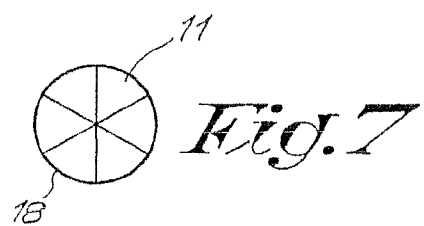
Fig.6  Fig.7
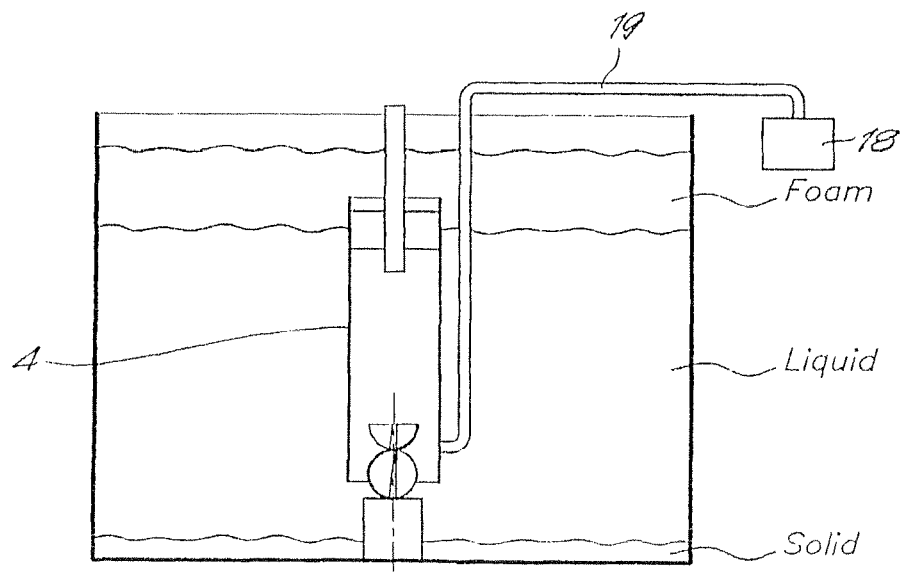
Fig.8

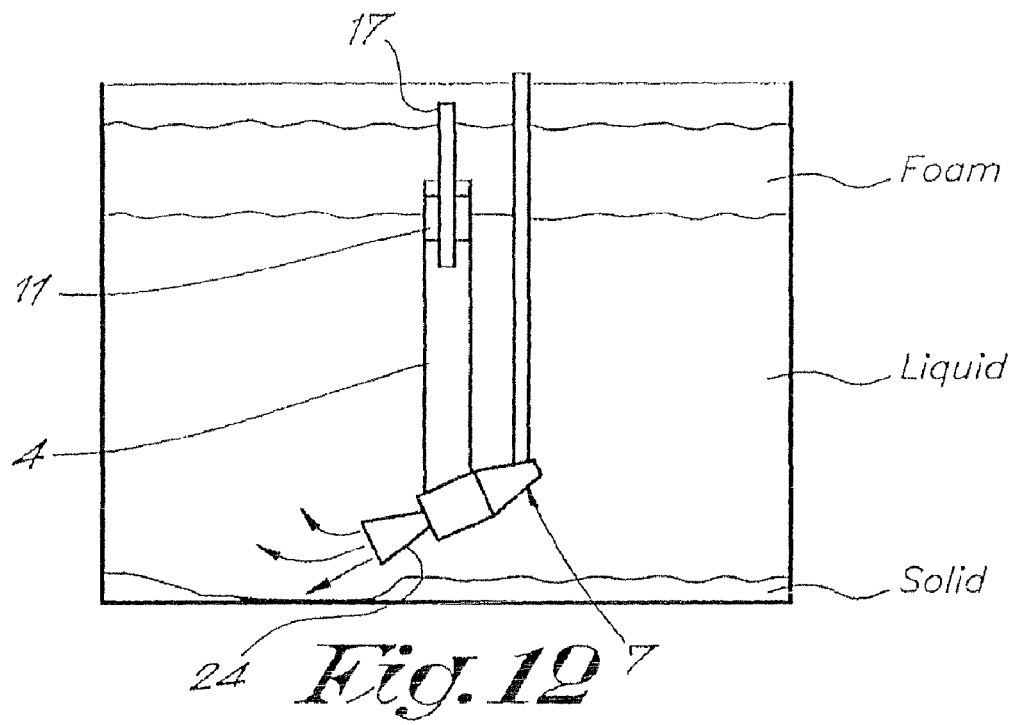
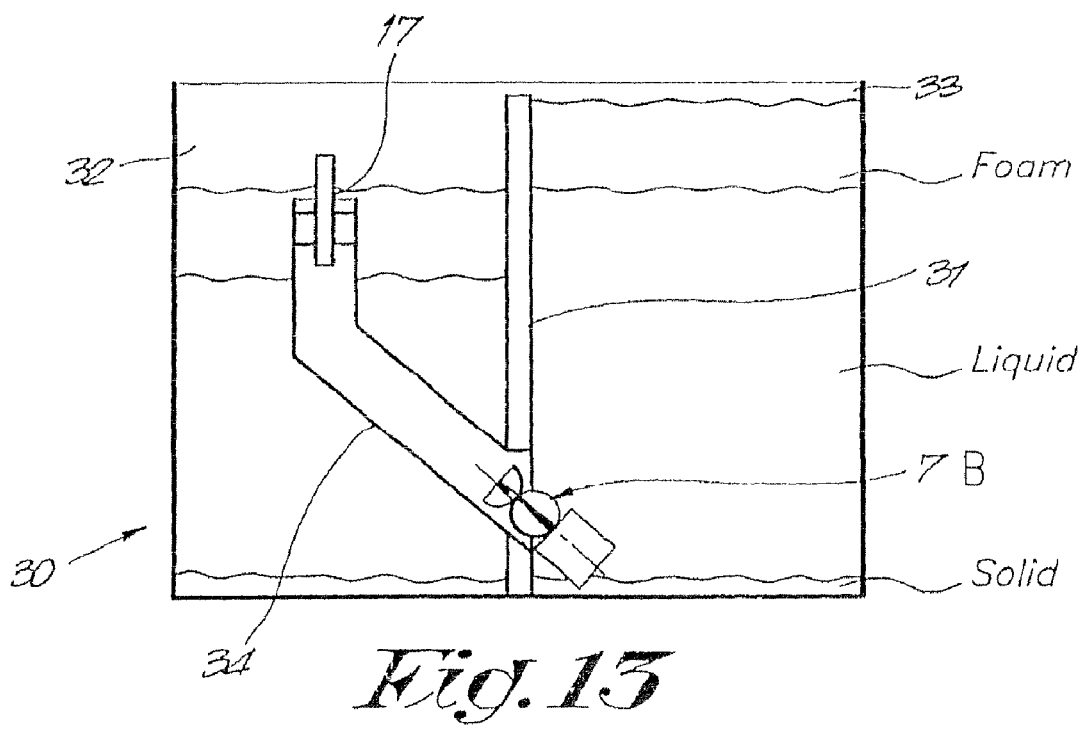

LIQUID—FOAM SYSTEM

The present application is a CIP application of PCT/BE2005/000169 filed on Nov. 22, 2005 and published under number WO2006/053408 on May 26, 2006, and claiming the benefit of the priority of European patent application EP04447257.9 filed on Nov. 22, 2004, the disclosure of which are incorporated herein by reference.

FIELD OF THE INVENTION

The invention relates to a system for treating an aqueous medium volume with floating foam.

THE PRIOR ART

An aeration device for introducing gas in a liquid such as wastewater of an activation basin is disclosed in U.S. Pat. No. 4,290,885. The device is placed in a tank. Said tank comprises a vertical tube with a top opening and a bottom opening, a propeller is mounted at the top of the tube so as to push water or liquid downwardly. An air conveying tube is provided, so that by the depression or suction created by the pushing propeller, air is sucked. Said air after passing through the propeller is pushed downwardly. A cap is provided above the top opening so that only liquid can pass in the cylinder. A drawback of Such a system is that air can stay in the cylinder and form big bubbles, which could be detrimental for a correct working of the propeller and/or causes damages at the propeller.

Other aerating devices are known, such as AQUA TURBO® devices sold by Applicant.

FR 2 798 602 discloses a device for the circulation of a liquid in order to ensure a gas diffusion. The device comprises a floating support bearing a tube provided with rotating blade for causing a downward movement of the liquid in the tube. The liquid is pushed downwards into said tube. Gas is admitted through the rotating blades.

Such a device will act as a foaming apparatus, due to the intense mixing of liquid and air in the tube.

CH 478242 discloses a container provided with a sucking means adapted for sucking air and liquid. Said device is used for ensuring a vigorous stirring of the liquids together, not for ensuring a degassing a foam layer.

AT 356018 discloses an aerating device provided with a sucking means at the bottom of the tank and a pipe for admitting air. This is no defoaming device.

CH 613 383 discloses a device for aerating a liquid and/or for removing foam from the upper surface of a liquid. There is gas exhaust tube for exhausting from the foam receiving chamber.

All these devices were unable to correctly treat the foam layer floating at the surface of the liquid.

In one aspect, the invention relates to a device enabling a good suction of foam and a good defoaming of said sucked foam, while enabling to exhaust gas released from the defoaming without having to recirculated said released gas into the liquid medium.

BRIEF DESCRIPTION OF THE INVENTION

In preferred embodiments, the invention relates to a foam breaking equipment for a system adapted for treating a liquid medium volume with floating foam, advantageously for recirculating or recycling foam after being broken and partly defoamed or with a lower gas content in the liquid or in another liquid contained in another tank, said liquid medium volume and said floating foam being contained in a tank having a bottom portion and an upper portion, whereby said foam breaking equipment comprises at least:

a foam conveying means with a funnel shaped upper inlet adapted for the passage of floating foam and a downward outlet;

a sucking means comprising a screw shaped element adapted to be driven in rotation for creating a downwards suction of foam present in the foam conveying means from the funnel shaped upper inlet of the foam conveying means towards the sucking means, said sucking means being adapted for causing at least a partial defoaming of foam in the foam conveying means and for expelling foam through the outlet of the foam conveying means, whereby gas is released by said at least partial defoaming of foam in said foam conveying means, and at least a first exhaust gas tube defining a channel adapted for removing from the foam conveying means gas released by said at least partial defoaming, said first exhaust gas tube extending at least partly in the foam conveying means and having a first opening adapted to be located above the funnel shaped upper inlet and a second opening located in the foam conveying means at least 20 cm below the level of the funnel shaped upper inlet of the foam conveying means.

Advantageously, the foam conveying means has a portion adjacent to the sucking means located below the second opening of the first exhaust gas tube, said portion having a section of passage for conveying foam towards the outlet of the foam conveying means, and in which the exhaust gas tube has a portion extending in the foam conveying means defining a channel with a surface of passage adapted for exhausting gas released by said at least partial defoaming of foam in the foam conveying means, whereby said surface of passage of said channel is comprised between 0.1 and 0.5 times, preferably 0.25 and 0.4 times the section of passage of said portion of the foam conveying means adjacent to the sucking means.

Preferably, the screw shaped element of the sucking means is a double helix element adapted to be driven in rotation for creating a downwards suction of foam present in the foam conveying means from the funnel shaped upper inlet of the foam conveying means towards the sucking means.

According to an advantageous embodiment, the sucking means has a portion bearing the screw shaped element, whereby at least said portion with the screw shaped element is mounted movable with respect to the foam conveying means so as to adapt the relative position of the screw shaped element with respect to the foam conveying means, for example within the conveying means.

Preferably, the sucking means has a portion bearing the screw shaped element, whereby at least said portion with the screw shaped element is mounted movable with respect to the foam conveying means so as to adapt the relative position of the screw shaped element with respect to an opening selected from the group consisting of the second opening of the first gas exhaust tube and the downwards outlet of the foam conveying means.

According to another advantageous embodiment, the sucking means has a portion bearing the screw shaped element, whereby at least said portion with the screw shaped element is mounted on a support adapted for modifying the relative position of the screw shaped element with respect to the foam conveying means. Preferably, the sucking means has a portion bearing the screw shaped element, whereby at least said portion with the screw shaped element is mounted on a support adapted for modifying the relative position of the screw shaped element with respect to an opening selected from the group consisting of the second opening of the first gas exhaust tube and the downwards outlet of the foam conveying means.

According to a detail of an embodiment, the sucking means has a portion bearing the screw shaped element adapted to be driven in rotation so as to create a downwards foam flow in the foam conveying means towards the screw shaped element, whereby at least said portion with the screw shaped element is mounted movable with respect to the foam conveying means so as to adapt the relative position of the screw shaped element with respect to the foam conveying means for controlling said downwards foam flow in the foam conveying means, or the sucking means has a portion bearing the screw shaped element adapted to be driven in rotation so as to create a downwards foam flow in the foam conveying means towards the screw shaped element, whereby at least said portion with the screw shaped element is mounted movable with respect to the foam conveying means so as to adapt the relative position of the screw shaped element with respect to an opening selected from the group consisting of the second opening of the first gas exhaust tube and the downwards outlet of the foam conveying means, for controlling said downwards foam flow in the foam conveying means.

According to another detail of embodiments, the exhaust gas tube has a portion extending in the foam conveying means, said portion having a length from 20 to 200 cm, for example from 20 to 100 cm.

According to further details of embodiments, the foam breaking equipment comprises one or more of the following characteristics:

the funnel shaped upper inlet of the foam conveying means is located at a first level, while the sucking means is located at a second level located below said first level of the funnel shaped upper inlet of the foam conveying means, whereby a distance of at least 40 cm separated said second level from said first level;

the funnel shaped upper inlet of the foam conveying means is located at a first level, while the sucking, means is located at a second level located below said first level of the funnel shaped upper inlet of the foam conveying means, whereby a distance of at least 100 cm separated said second level from said first level;

the funnel shaped upper inlet of the foam conveying means is located at a first level, while the sucking means is located at a second level located below said first level of the funnel shaped upper inlet of the foam conveying means, whereby a distance of at least 150 cm separates said second level from said first level;

the second opening of the first gas exhaust tube is located at a first level, while the sucking means is located at a second level located below said first level of said second opening, whereby a distance of less than 50 cm separates said second level from said first level;

the second opening of the first gas exhaust tube is located at a first level, while the sucking means is located at a second level located below said first level of said second opening, whereby a distance of comprised between 1 mm and 25 cm separates said second level from said first level;

the foam conveying means has a lower portion adjacent to the outlet of the foam conveying means, whereby the sucking means is selected from the group consisting of sucking means adapted for being adjacent to the bottom of the tank, while being adjacent to said lower portion of the foam conveying means, and sucking means attached to the foam conveying means so as to extend adjacent to the lower portion of said foam conveying means;

the foam conveying means comprises a first upper portion in which the first gas exhaust tube extends and a second lower portion in which said first gas exhaust tube does not extend, whereby adjacent to the second lower portion of the foam conveying means, a first surface of passage for conveying foam in the foam conveying means is defined in the first upper portion, while adjacent to the first upper portion of the foam conveying means, a second surface of passage for conveying foam in the foam conveying means towards the sucking means is defined in the second lower portion, whereby said second surface of passage is larger than the said first surface of passage;

the foam conveying means comprises a first upper portion in which the first gas exhaust tube extends and a second lower portion in which said first gas exhaust tube does not extend, whereby adjacent to the second lower portion of the foam conveying means, a first surface of passage for conveying foam in the foam conveying means is defined in the first upper portion, while adjacent to the first upper portion of the foam conveying means, a second surface of passage for conveying foam in the foam conveying means towards the sucking means is defined in the second lower portion, whereby said second surface of passage is comprised between 1.1 and 3 times the said first surface of passage;

it comprises a means adapted for admitting a gas in the foam conveying means below the funnel shaped inlet and/or a means adapted for admitting a gas in the foam conveying means in the neighborhood of the screw shaped element;

the foam conveying means is provided adjacent to the funnel shaped inlet with a means selected from the group consisting of means adapted for breaking foam extending above the funnel shaped upper inlet, means adapted for breaking foam extending in front of the funnel shaped upper inlet, means adapted for breaking foam in the foam conveying means adjacent to the funnel shaped upper inlet, means adapted for disturbing foam extending above the funnel shaped upper inlet, means adapted for disturbing foam extending in front of the funnel shaped upper inlet, means adapted for disturbing foam in the foam conveying means adjacent to the funnel shaped upper inlet, and combinations thereof;

the foam conveying means comprises a wall adapted to define in the tank containing said liquid medium volume with floating foam a chamber, said chamber being adapted for communicating with the floating foam substantially only via the funnel shaped upper inlet and with the liquid medium volume via the downward outlet of the foam conveying means, and in which the foam breaking equipment further comprises at least one means adapted for conducting at least one chemical additive or reactive in the chamber defined by the wall of the foam conveying means;

at least a portion of the foam conveying means is adapted for being mobile with respect to the tank containing the aqueous medium with floating foam, so as to control at least the position of said portion with respect to the tank, whereby advantageously the foam conveying means comprises at least a lower portion and an upper portion, the upper portion being at least adapted for being mobile with respect to the tank, while preferably the foam breaking equipment comprises at least a floating element on which the upper portion of the foam conveying means is mounted;

the foam breaking equipment comprises a driving motor for driving into rotation the screw shaped element, said driving motor being selected from the group consisting of driving motors suitable to be immersed in the liquid and driving motors suitable to located above the liquid level;

the foam conveying means comprises two portions mobile the one with respect to the other;

the foam conveying means comprises an upper portion provided with the funnel shaped upper inlet, a lower portion and at least one means for adjusting the position of the upper portion with respect to the lower portion and for maintaining said position; whereby advantageously in the neighborhood of the lower portion, the upper portion in which the gas exhaust tube extends has a first surface of passage for conveying foam towards the lower portion, while in the neighborhood of the sucking means, the lower portion has a second surface of passage for conveying foam towards the sucking means, whereby the second surface of passage is comprised between 1.05 and 5 times the first surface of passage;

the foam conveying means comprises an upper portion and a lower portion mobile the one with respect to the other, and in which the upper portion has at least one wall defining an extension partly engaged in a channel formed by at least one wall of the lower portion, whereby between the wall of the extension of the upper portion and the wall of the channel of the lower portion, at least one channel adapted for the passage of liquid from the liquid medium volume contained in the tank, whereby advantageously the channel of the lower portion comprises at least a first part in which the extension of the upper portion is engaged and in which the first gas exhaust tube extends, and a second part adjacent to the sucking means in which the first gas exhaust tube does not extend, said first part having a first surface of passage for conveying foam towards the second part, while the second part has a second surface of passage for conveying foam towards the sucking means, whereby the second surface of passage is comprised between 1.05 and 5 times, preferably between 1.2 and 2 times the first surface of passage;

it comprises a means adapted for controlling the pressure in the foam conveying means;

the sucking means and the foam conveying means are adapted for recirculating foam (advantageously intense recirculation or remixing of the foam after its partial defoaming) into the liquid volume after its partial defoaming, the foam conveying means is associated to more than one gas exhaust tubes, so as to exhaust gas released from the broken/defoamed foam in the foam conveying means at different levels.

The foam breaking equipment of the invention is suitable for treating an aqueous medium volume (i.e. a medium containing water) with floating foam. Advantageously, the difference between the level of the upper inlet of the foam conveying means and the level of the sucking means is at least 40 cm, advantageously at least 100 cm, preferably at least 150 cm.

Advantageously, the upper inlet of the foam conveying means has a surface of passage or opening adapted for the passage of floating foam, especially a thick foam, such as foam with a density greater than 0.05, preferably greater than 0.1, such as greater than 0.15, 0.20, 0.25, etc. The upper inlet is advantageously provided with means for controlling the flow of floating foam into the conveying means and/or a means for controlling the overflow of floating foam towards the conveying means. For example the conveying means is associated to an foam overflow system, the position of which can be regulated or adapted via a regulation system. Such a regulation system can for example adapt the position of the overflow level relative to the position of the sucking means, in function of the upper foam level.

According to another embodiment, the upper inlet has a surface of passage adapted for the passage of floating foam, whereby said inlet comprises a means adapted for breaking and/or disturbing the foam extending above the inlet or in front of the inlet. Said means is advantageously also a means guiding the foam in a portion of the conveying means.

Preferably, the means for pre-breaking or guiding the foam in the conveying means towards the sucking means is an element extending at least partly in the conveying means and adapted to extend at least partly at a level above the foam.

Advantageously, the element extends in the conveying means on a length of at least 10 cm, preferably from 20 cm to 100 cm.

Preferably, the conveying means in its portion where the element or the gas exhaust tube extends has a substantially ring-shaped or annular passage for foam or a passage defined between a first (advantageously cylindrical) wall and a second (advantageously cylindrical) wall, the second wall extending at least partly in the volume defined by the first wall. The conveying means can be further be provided with one or more distinct foam disturbing systems located between the inlet and the outlet of the conveying means, preferably between the upper inlet and the sucking means. Such disturbing systems can for example be fins extending between said first and second walls.

The outlet of the gas exhaust tube can be associated to a gas suction means, such as a propeller, a fan or a gas sucking means driven into rotation by the wind. The working of such gas suction means will be controlled so as to avoid that foam is sucked into the gas exhaust tube.

The surface of passage of the channel for gas exhaust or air inlet is advantageously comprised between 0.1 and 0.5, preferably between 0.25 and 0.4 times the surface of passage of the portion of the conveying means adapted for foam which is adjacent to the sucking means.

The gas exhaust tube can be provided with a system for controlling the passage/exhaust of gas.

According to a preferred embodiment, the system comprises a funnel shaped element adapted for conveying foam towards the opening of the conveying means or duct, whereby said funnel shaped element is associated to level regulating system adapted for controlling the level of foam flowing in the funnel shaped element by overflow. For example the funnel shaped element is associated to a fixation element or a positioning system enabling a regulation or control of the overflow level. The foam flows then towards the opening of the conveying means, which is provided with a means adapted for breaking and/or disturbing the foam present above the inlet or in front of the inlet.

According to an advantageous embodiment, the conveying means has one or more inlets defining a total inlet surface adapted for receiving foam and defines a chamber guiding the fluid and/or foam towards the sucking means, whereby said chamber has at least a portion with a surface of passage greater than said total inlet surface for foam, said portion being adjacent to the sucking means. Advantageously, said portion of the chamber with an enlarged surface of passage has a surface of passage comprised between 1.1 and 5, preferably between 1.2 and 2 times the total inlet surface adapted for receiving foam.

Preferably, the foam is conveyed in the conveying means in at least two portions, a first portion or upper portion adjacent to the inlet or inlets for receiving foam and a second or lower portion adjacent to the sucking means, whereby the second portion has a surface of passage comprised between 1.05 and 5, preferably between 1.2 and 2 times the surface of passage of the first portion.

According to a further detail of said preferred embodiment, the chamber comprises at least a third portion intermediate between the first (or upper) and the second (or lower) portion, said third portion having a surface of passage greater than the surface of passage of the first portion, but lower than the surface of passage of the second portion.

The surface of passage of one or another portions is calculated in a plane perpendicular to the flow direction of the foam.

According to an advantageous embodiment, the conveying means comprises inner wall and is associated to a means for admitting some liquid, in particular some liquid from the bath to flow at least partly along said inner wall of the conveying means. Such a flow seems to be advantageous for the downwards movement of the foam towards the sucking means.

When the conveying means comprises two portions(a lower and an upper) which are mobile the one with the other, whereby one portion extends at least partly in the hollow space of the other portion, and whereby spaces or channels are formed between the inner wall of one portion and the outer wall of the other portion, said channels or spaces being adapted for enabling a flow of liquid into the conveying means, said liquid flowing then at least partly along the inner wall of the lower portion.

The equipment can further comprise a sprinkler system and/or an anti-foam dosing system and/or a mixer and/or a submersible aerator.

According to a specific embodiment, the gas exhaust tube is an open tube provided at its lower end engaged in the conveying means with lateral openings or openings in its lateral wall. The lower end of said open tube can also be enlarged ( such as a reverse funnel shape).

The gas exhaust tube is advantageously mounted mobile with respect to at least a portion of the conveying means, whereby the position of the tube can be adapted, for example controlled with respect to the position of the sucking means.

Preferably, the conveying means comprises an upper portion and a lower portion, the upper portion being movable with respect to the lower portion, whereby the element is attached to the upper portion and whereby a means is adapted for adjusting the relative position of the upper portion with respect to the lower portion and a means is adapted for maintaining said relative position between the lower and upper portions. Advantageously, the upper portion is provided with a funnel shaped element guiding the foam towards the foam receiving inlet of the conveying means.

The lower portion is advantageously mounted on a floating support.

The suction means can be located completely in the conveying means, completely out of the conveying means or partly in and partly out of the conveying means.

A preferred foam breaking equipment is shown in the attached FIGS. 19 and 20.

Other details and characteristics of the foam breaking equipment and conveying means of the invention are disclosed in the description of the system of the invention.

The invention relates also to a treatment installation comprising at least one tank adapted for containing a liquid medium with floating foam, and a foam breaking equipment of the invention as disclosed here above and having one or more characteristics of the foam breaking equipment of the invention disclosed here above as well as in the attached claims.

According to an embodiment the sucking means and the foam conveying means are adapted for recirculating or recycling foam into the liquid volume of the tank. Said recycled foam is mixed vigorously with the liquid.

According to another embodiment the treatment installation comprises a further tank, whereby the sucking means and the foam conveying means are adapted for conveying foam towards said further tank and/or possibly partly towards the first tank and said further tank.

The further tank is advantageously associated to the first tank so as to transfer liquid and/or foam from said further tank towards the first tank, for example by overflow.

The treatment installation further comprises advantageously at least one aerator.

The invention still relates to a treatment installation comprising at least a first tank and a second tank connected to the first tank by a piping system comprising a conveying means adapted for conveying at least a fluid, possibly in the form of a foam, said conveying means having an inlet opened in the first tank and an outlet opened in the second tank, whereby the first tank is adapted for containing a medium volume, possibly with floating foam, said tank having a bottom and an upper portion, in which a fluid sucking means is associated to the fluid conveying means, said fluid sucking means being adapted for sucking fluid from the first tank into the conveying means, characterized in that the sucking means associated to the conveying means is adapted for creating a downwards suction of fluid in the conveying means from the inlet towards the sucking means, whereby the difference between the level of the inlet and the level of the sucking means is at least 40 cm, advantageously at least 100 cm, preferably at least 150 cm.

The invention further relates to a process for breaking foam floating on a liquid medium contained in a first tank in which floating foam is broken in a foam breaking equipment of the invention, advantageously by using an installation of the invention, said equipment and installation having one or more characteristics as disclosed here above or as disclosed in one or more of the attached claims.

In said process, floating foam flows into the funnel shaped upper inlet, for example by overflow. Said foam, possibly disturbed by one or more fins, flows in the conveying means towards the sucking means. When the foam arrives near the end of the gas exhaust tube, the sucked foam falls in a zone with an enlarged section and is broken while downwardly sucked by the rotating screw. Gas is then released from the broken foam. Said gas is exhausted through the gas exhaust tube.

The foam remaining after its at least partial breaking by the screw is then expelled back in the tank or in another tank. In said process, the foam divided in small particles is advantageously expelled and mixed intensively with liquid of a tank (the first tank or another tank).

In said process, the liquid medium is advantageously aerated, for example by one or more distinct aerators, while foam is broken into one or more foam breaking equipments of the invention.

Advantageously, the liquid medium is intermittently aerated, an aeration step being stopped when the foam in the tank reach an upper level, while an aeration step is started back when the foam in the tank is below an admissible foam level.

In such a process, the foam is advantageously sucked broken and reintroduced in the liquid portion of the volume, preferably near the bottom of the volume. This enables a better treatment of the material, such as fatty material or compounds present in the foam.

In the invention, the conveying means can be a tube or piping system which can have a variety of shapes including conical, truncated cone, cylindrical, flared, combinations thereof. The cross section can also be square, rectangular, octagonal, hexagonal, etc.

The liquid possibly admitted in the conveying means can be liquid from the water treatment volume or from another water treatment tank, such as a hydrolysis tank. The liquid is advantageously introduced under pressure, for example by means of one or more jets, hydrojets, or by simple gravity.

The conveying means can be made in various material. Preferably, the material used will be such that the face in contact with the foam will be water repellent and/or with anti adhesion properties. The inner surface of the conveying means or pipe, especially its upper portion adjacent to the inlet can be provided with blades or fins so as to cut or further disturb the foam passing into the conveying means.

Details and characteristics of preferred embodiments will be disclosed in the following description in which reference is made to the attached drawings.

In said drawings,

FIG. 5 is a schematic view of a third embodiment of a treatment tank in accordance with the invention;

FIG. 6 is a cross-sectional view taken along line VII-VII of FIG. 5, showing the pipe;

FIG. 7 is a cross-sectional view taken along line VII-VII of FIG. 5, showing the pipe;

FIG. 8 is a schematic view of a fourth embodiment of a treatment tank in accordance with the invention;

FIG. 12 is a schematic view of a seventh embodiment of a treatment tank in accordance with the invention;

FIG. 13 is a schematic view of an installation of an eighth embodiment of the invention;

Figure 1:
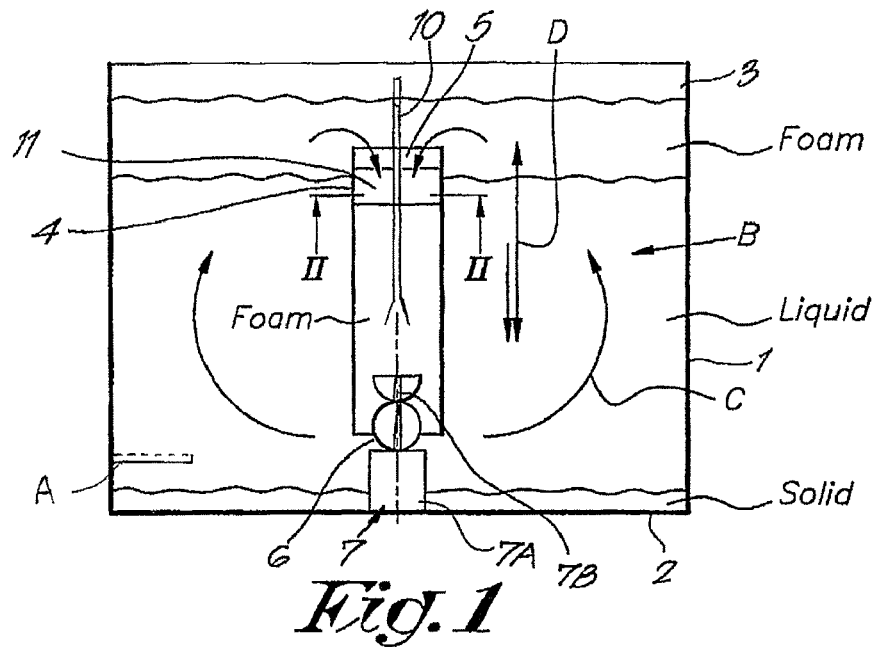
FIG. 1 is a schematic view of a liquid/foam (for example water/foam) treatment tank of the invention.

FIG. 1 is a schematic view of a tank 1 for treating an aqueous medium volume B with formation of a thick and dense floating foam layer. The tank 1 is provided with one or more aerators A (such as in the form of a bubbling system located adjacent to the bottom of the tank, other known aerating system can be used). The volume B comprises a solid or substantially solid layer deposited on the bottom 2 of the tank 1, a liquid layer with material or bacteria or other microorganism in suspension, and a thick and dense foam layer floating on the liquid layer. The foam formed by the aerator(s) is floating in the upper portion 3 of the tank 1. The tank is further provided with a foam breaking and recirculating system which is advantageously located away from the aerator(s). The foam breaking system comprises a pipe 4 which may be of PVC with an inner silicon coating (other materials can be used, such as steel, stainless steel, aluminum, etc.) and which extends between an inlet 5 located in the upper portion 3 (i.e. in the foam layer) and an outlet 6 adjacent to the bottom 2 or to a lower portion of the volume. A suction means 7 (preferably includes a motor 7A rotatably driving a double helix centrifugal impeller 7B (screwpeller® sold by Aquasystems International NV, Belgium). The suction means 7 is adapted for sucking the fluid (in the form of foam) present in the pipe 4 and for projecting and mixing said sucked foam with liquid present in the bottom of the tank. The suction means provides a water circulation illustrated by arrows C which is thus created in the volume B. The foam falls in the pipe 4, as said pipe is immersed in the liquid layer, and the rotation of the impeller 7B causes the foam to move downwardly in the pipe. The liquid level in the pipe 4 corresponds advantageously to substantially the upper level of the impeller 7B. The distance D between the inlet 4 and the suction means 7 is advantageously of at least 40, preferably more than 50 cm, most preferably more than 100 cm, such as 200 cm or even more such as 300 cm, 400 cm, 500 cm. etc.

Figure 2:
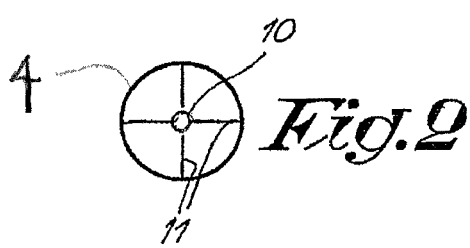
FIG. 2 is a cross section view along the line II-II in the tank of FIG. 1.

In order to facilitate the flow of foam in the pipe 4, the pipe 4 is provided at its inlet with a tube 10 attached to the pipe by several plates 11 extending at least partly vertically. FIG. 2 shows one example of the pipe 4 having the tube 10 and plates 11. The tube 10 advantageously has an inner diameter of more than 2 cm and extends partly into the pipe (for example on a length of 20 to 50 cm, and partly outside of the pipe 4 (preferably at least partly above the foam layer). The top of the tube 10 can be used as means for detecting when the foam layer is at a level above an admissible level. The tube 10 and the plates 11 act as means for disturbing the foam layer and guiding foam towards the impeller, thereby facilitating the suction of the foam in the pipe 4.

The tube 10 also reduces the cross-sectional area of passage of the pipe near its inlet 5 with respect to the section near the impeller 7B. The foam falling from the portion in which the tube 10 extends falls thus into a zone with a larger cross-sectional area of passage.

The tube 10 also functions as a gas exhaust conduit, that is, the tube 10 is also adapted for removing gas released by the breaking or defoaming of foam within the pipe.

Advantageously, a funnel may be mounted at the top of the pipe 4 for facilitating and improving the flow of foam in the pipe. See, for example, the funnel-shaped extension 104 shown in FIG. 19. Such use of a funnel facilitates the entry of sufficient foam into the inlet 5 of in the pipe 4.

Figure 4:
FIG. 4 is a cross section view along the line IV-IV in the second embodiment.
Figure 3:
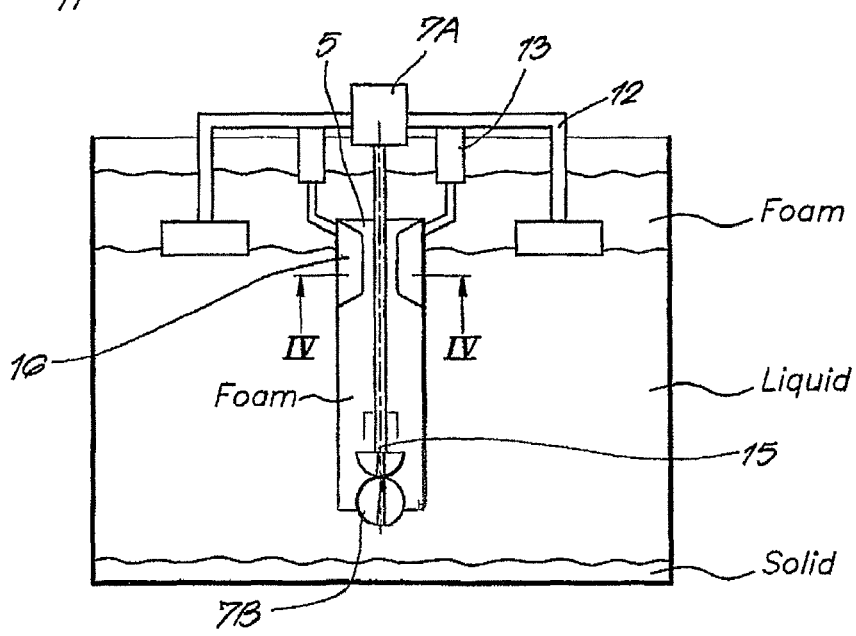
FIG. 3 is a schematic view of a second embodiment of a treatment tank in accordance with the invention.

FIG. 3 is a view similar to that of FIG. 1, except that in this alternate embodiment of the foam breaking and recirculating system hereof, the motor 7A is mounted on a floating support 12. The floating support carries the pipe 4 by means of pieces 13 enabling adjustment of the relative vertical position of the inlet 5 with respect to the floating support 12 and thus with respect to the foam layer. A rod 15 rotatable driven by the motor 7A extends in the pipe and acts as means for breaking the foam layer at the inlet 5 and in the pipe 4. The rod is advantageously provided with a small helical screw 7B adapted for creating a downwards movement of compounds present on the rod or in contact with the rod 15. The pipe 4 is provided near its inlet 5 with a series of inner fins 16 (shown in cross-section in FIG. 4) so as to break the foam layer. By adapting the level of the inlet 5, it is possible to use the system as a simple mixer (with the inlet positioned at a level below the foam layer), a system for ensuring a correct treatment of the foam layer (inlet in or adjacent to the foam layer), and as an aerator (inlet above the foam layer).

The rod 10 is preferably hollow so as to enable the exhaust of gas released from the breaking and defoaming operation near the impeller. The rod is provided with or coupled to a gas collecting chamber, such that the gas may be collected before said gas is exhausted via the opening and channel of the rod 10.

FIG. 5 is a view of another alternate embodiment similar to that of FIG. 1, in which a pipe 17 is adapted for removing as from the pipe (gas generated or released by the defoaming of foam in the pipe 4), while the pipe 4 is provided with an additional foam breaking equipment 18 such as vertically oriented, circumferentially spaced plates arranged and positioned with the pipe 4 in spaced relationship to and thus distant from the foam breaking equipment formed by the plates 11. FIG. 6 is a cross-sectional view taken through the plates 11, while FIG. 7 is a cross-sectional view taken through the additional plates of the additional foam breaking equipment 18.

FIG. 8 is a view of an embodiment similar to that of FIG. 1 except that a gas (e.g., air, oxygen enriched air, oxygen, etc.) is introduced in the pipe at the level of the impeller 7B. Said gas, for example gas with a pressure of 1 to 10 $10^5$ Pa, is issued from a gas compressor 19 and conveyed to the pipe 4 by the flexible duct $19^1$. Such an air/oxygen inlet increases the oxygenation of the treatment bath, after the defoaming or foam breaking operation in the pipe 4.

The foam after its partial defoaming is intensively mixed with the liquid.

Figure 9:
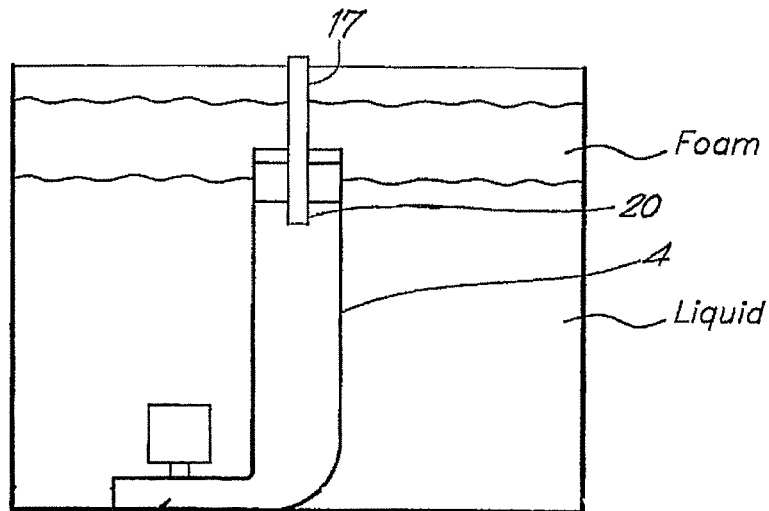
FIG. 9 is a schematic view of a fifth embodiment of a treatment tank in accordance with the invention.
Figure 10:
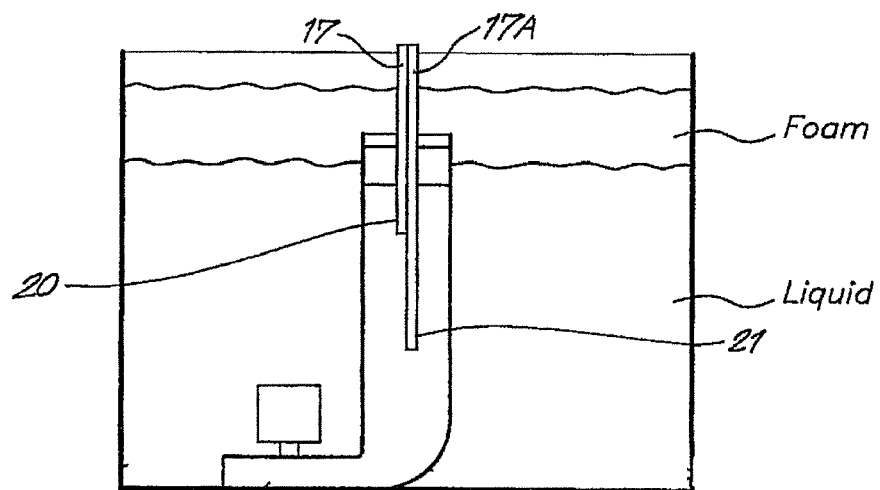
FIG. 10 is a schematic view of a sixth embodiment of a treatment tank in accordance with the invention.

FIGS. 9 and 10 are views of embodiments similar to the embodiment of FIG. 5, except that a propeller (submersible propeller used for aerating a volume, such as AQUA TURBO® sold by Aquasystems International NV, Belgium) is used instead of a screw impeller (the screw impeller being however preferred), and that the lower end 20, 21 of the pipe 17, 17A is provided with means for directing the flow of air or gas or with means for controlling the exhaust of gas from the pipe 4. When gases have to be exhausted, having exhaust pipes with lower openings located at different level, enables a better control of the gas exhaust during the downwards flow of the foam in the pipe 4, thereby ensuring a better downwards flow of the foam.

Figure 11:
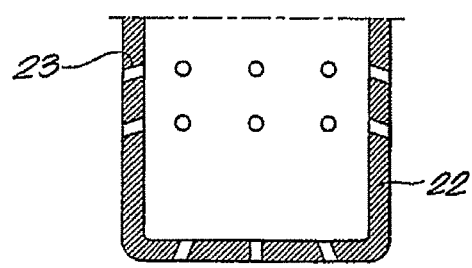
FIG. 11 is a detail view of the means for introducing a gas in the conveying means used in the embodiments of FIGS. 9 and 10.

When gas or liquid (such as a defoaming liquid) is admitted in the pipe 4, the lower end 20, 21 of the pipe 17 or 17A preferably is provided with a cap 22 (see FIG. 11). The cap 22 has a series of small channels 23 adapted for the passage of gas (air, oxygen, nitrogen, etc.) or liquid in the form of jets. Advantageously, the gas in the pipes is pressurized gas. In the foam breaking system having two pipes 17 and 17A, advantageously, the pipe 17A is used for injecting a defoaming liquid, while the pipe 17 is used for exhausting gas.

In the embodiment of FIG. 10, two gas pipes 17, 17A are used, the bottom of the pipe 17A being at a level lower than the level of the bottom of the pipe 17. This enables one to control the admission and/or exhaust of air or gases as a function of the level of the respective pipe 17, 17A.

FIG. 12 is a view of an embodiment similar to that of FIG. 5, except that the suction means 7 is a submersible aerator with a diffusion head 24. The foam breaking in the pipe 4 is not optimal.

FIG. 13 is a view of an installation of the invention. Said installation comprises a tank 40 provided with an inner wall 41, so as to define two distinct reservoirs 42, 43. A rotatably driven screw impeller 7B sucks foam from the floating foam layer of the reservoir 42 through the inclined tube 44 and mixes said foam after its partial defoaming (and the exhaust of gas via the pipe 17) with the content of the reservoir 43. The upper portion of the tube 44 is provided with a tube 17 enabling a gas exhaust due to the gas released when the defoaming or partial defoaming of the foam.

Foam of the reservoir 43 or compound issued from said foam can be recycled back in the reservoir 42 by overflow above the inner wall 41. Liquid overflow is also possible through openings in the walls.

This installation have two distinct zones of treatment. The zone of treatment of reservoir 43 being for example a zone where various additives or microorganisms are added for a better treatment of the fat present in the foam, as well as other materials or compounds, especially compounds or materials floating on the liquid bath or low density materials.

Each zone or reservoir 42, 43 can be provided with various means, such as mixer, aerator, sprinklers, anti-foaming dosing, floatable re-entrainer, submersible aerator, inlet pipe, outlet pipe, device (with screw) for removing sinking solids, etc.

Possibly the upper portion of the pipe 4 or tube 43 is mobile with respect to the tank 1 or tank 40, said portion being then mounted on a floating support and connected via a flexible pipe to the pipe 4 or the tube 44.

Figure 14:
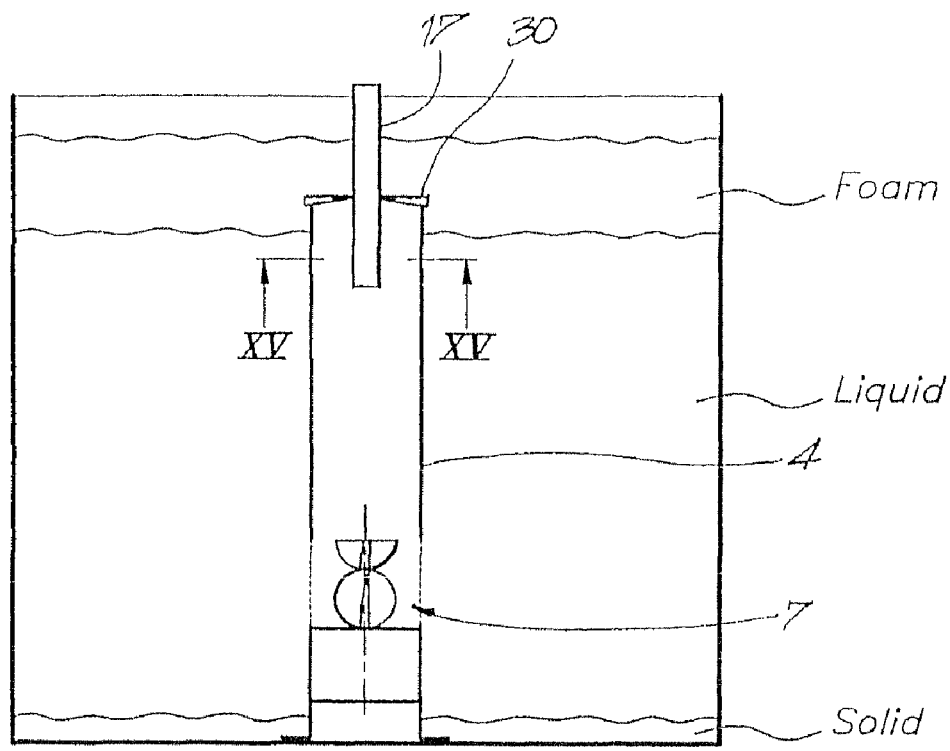
FIG. 14 is a schematic view of a ninth embodiment of a treatment tank in accordance with the invention.

FIG. 14 is a view of a system similar of FIG. 5, except that the suction means is located above the bottom 2, for example at a layer sufficient for having no or a gentle agitation at the bottom level.

Figure 15:
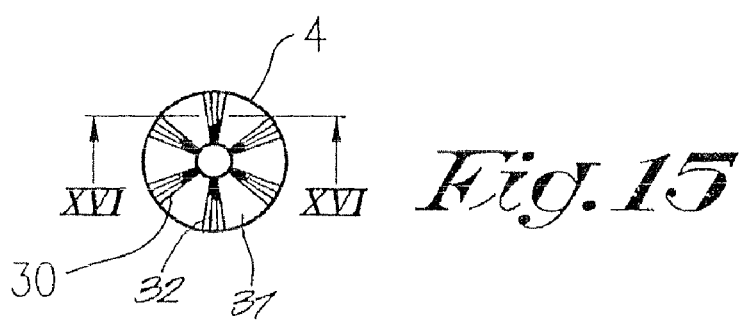
FIG. 15 is a cross section view along the line XV-XV of FIG. 14.
Figure 16:
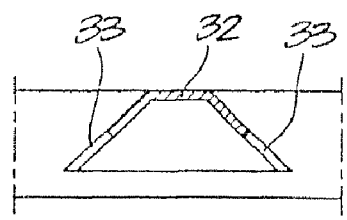
FIG. 16 is a cross section view along the line XVI-XVI of FIG. 15.
Figure 17:
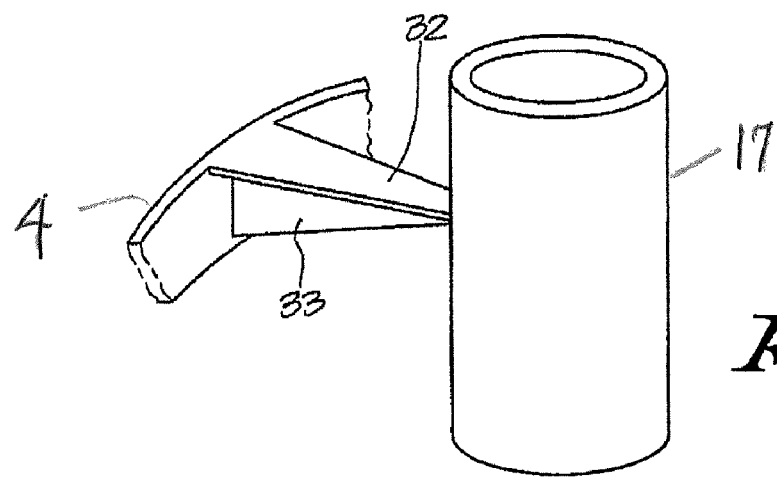
FIG. 17 is a partial perspective view of a detail of FIG. 14.

The top of the pipe 4 is provided with a cap 30 suitable for bearing the pipe 17. As shown in FIGS. 15, 16 and 17, the cap 30 has openings 31 defined between radial arms 32 provided with flaps 33.

Figure 18:
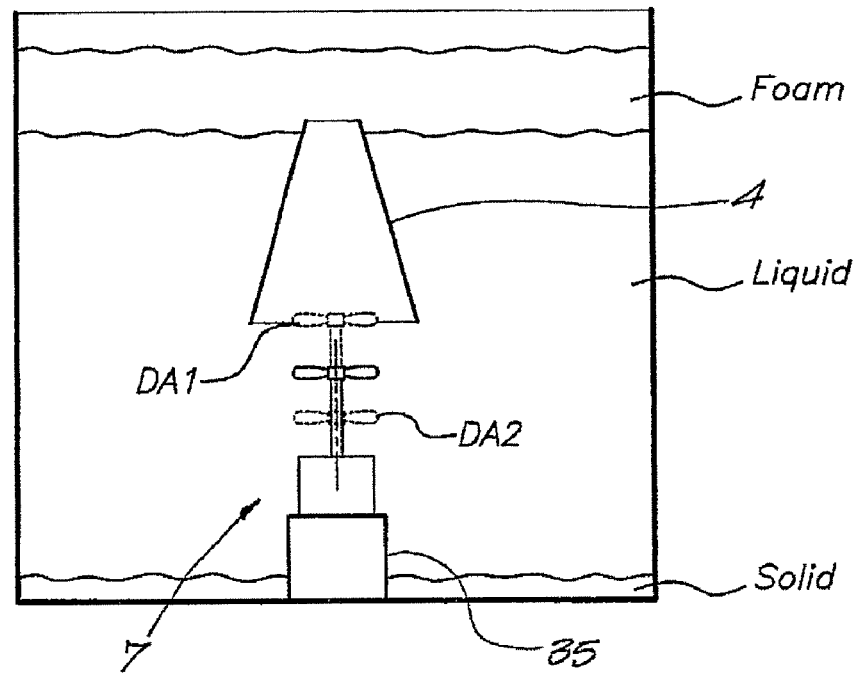
FIG. 18 is a schematic view of a tenth embodiment.

FIG. 18 is a view of a further embodiment in which the conveying means 4 has a shape of a truncated cone, the top thereof being directed upwardly. The suction means is mounted on a support 35 adapted for modifying the position of the paddles or screw so that the paddles or screw (preferably screws) is completely in the pipe 4 (dashed line DA1), completely outside the pipe (dashed lines DA2), or partly in and out. By modifying the position of the sucking means (screws) with respect to the conveying means, it is possible to control the flow of foam into the foam conveying means.

Figure 19:
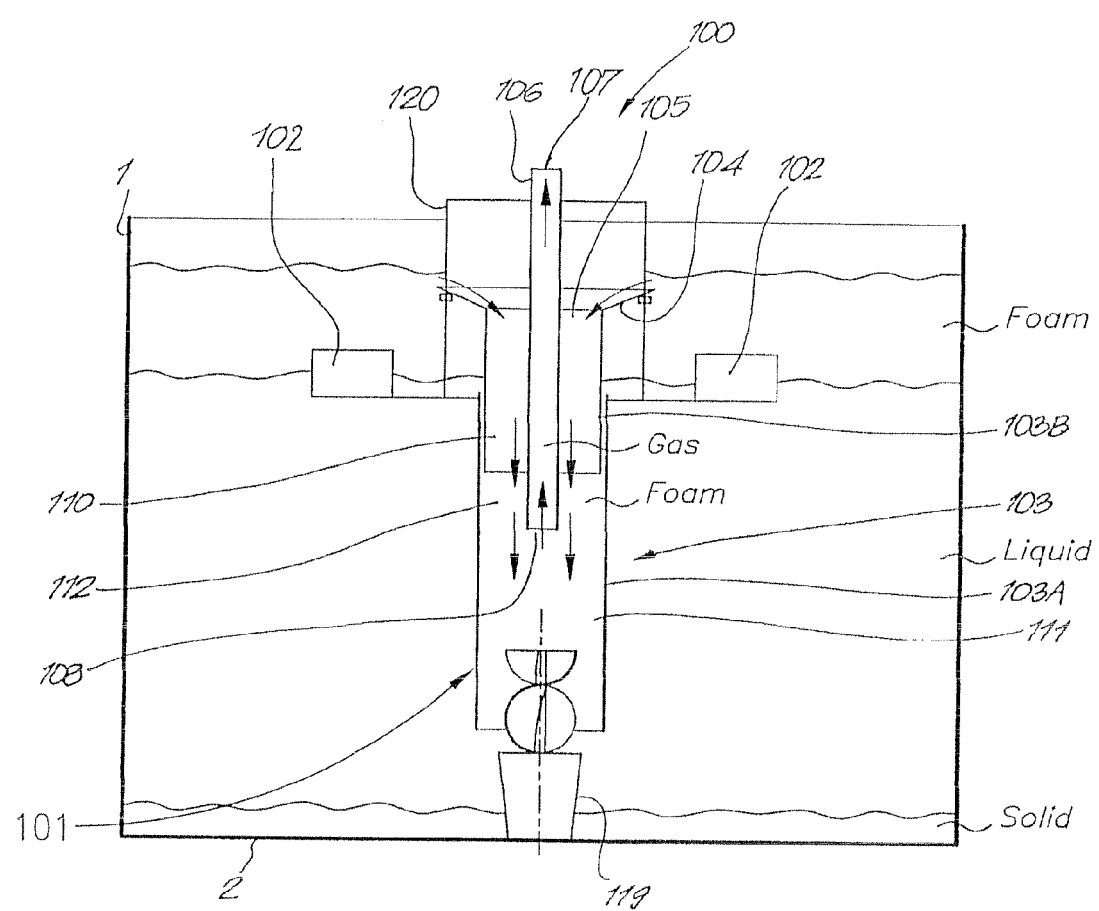
FIG. 19 is a further schematic view of a foam breaking equipment of the invention in a system of the invention.

FIG. 19 is a schematic view of a preferred foam breaking equipment of the invention in a system of the invention. Said system comprises a tank adapted for containing a liquid or substantially liquid medium or suspension, on which a dense and thick foam layer floats. Said tank is provided with a foam breaking equipment 100 adapted for recycling and breaking foam into the liquid medium, for example floating or close to the bottom 2 of the tank 1.

The foam breaking equipment 100 comprises:

a floating support 102;

a substantially vertical piping system 101, said piping system comprising a pipe 103 having an lower portion 103A attached to the floating support 102, and an upper portion 103B mobile with respect to the lower portion 103A. The upper portion 103B is partly engaged in the channel of the lower portion 103A. The upper end of the upper portion 103B is provided with a funnel shaped extension 104 adapted for guiding foam towards the upper annular opening 105 of upper portion 103B.

a means 120 for adapting the position of the funnel shaped extension 104 with respect to the floating support 102, whereby adapting the position of the second portion 103B of the piping system, with respect to the lower portion 103A of said piping system. Said means is also advantageously a means for maintaining or for controlling a specific position, for example for ensuring that substantially only the top surface of the foam layer is flowing in the extension 104 towards the opening 105.

a pipe 106 attached to the upper portion 103B and/or to the extension 104 and/or to an extension of the floating support, so that a portion of the pipe 106 extends within the lower portion 103A and below (outside) said lower portion 103A, while another portion of the pipe 106 extends through the funnel shaped extension 104 and above said extension 104. The upper opening 107 of the pipe 106 is adapted for extending above the foam layer, while the lower opening 108 of the pipe extends in the lower portion 103A. Between the outer wall of the upper portion 103B and the inner wall of the lower portion 103A, one or more channels are formed for the flow of liquid. The upper edge of the lower portion 103A is adapted for extending with in the liquid phase, i.e. below the foam phase. This or these channels ensure a flow of liquid from the treatment bath along at least a part of the inner wall of the lower portion 103A.

a sucking means, advantageously a screw impeller 117, preferably a double helix centrifugal impeller, adapted for sucking liquid and/or foam from the lower portion 103A and expelling said liquid and foam back into the liquid treatment bath. The helix shaped blade extends at least partly in the lower portion 103A. Said impeller is for example attached to the lower portion 103A and to the floating support 102. For example, the motor 119 driving the screw 117 is attached through arms 118 to the lower portion 103A. Said arms 118 are advantageously adapted for modifying the relative position of the screw 117 with respect to the pipe 103 and for maintaining said relative position. The arms 118 enables thus to adapt the length of the screw 117 extending in the pipe 103 and the length of the screw extending outside said pipe 103. By adapting the relative position of the screw, it is possible to control the flow of sucked foam or of the suction force. Said relative position can be controlled continuously as a function, for example, of the degree to which the lower portion 103A of the pipe 103 is depressed beneath the foam/liquid interface.

By having a portion of the screw extending outside of the pipe 103A, foam after its breaking and its partial defoaming is intensively mixed with liquid from the tank and dispersed in said liquid in the form of small foam bubbles. It generates thus a recirculation or recycling of broken and partly defoamed (with less gas) of foam.

The pipe 106 can also be movable with respect to the pipe 103A or can be provided with an extension, so as to be able to adapt the position of the opening 108 of the gas exhaust tube 106 with respect to the screw 117. By adapting the position of the opening 108 of the pipe 106 or its extension, it is possible to adapt the distance separating between the opening 108 and the screw, for example to a distance lower than 50 cm, advantageously lower than 20 cm, such as comprised between 1 mm and 15 cm.

In said configuration the piping system 101 defines a channel for the flow of foam towards the bottom, said channel comprising at least the three following portions an upper portion 110 with an annular passage area S1 defined between the inner cylindrical wall of the upper portion 103B of the piping system and the outer wall of the gas exhaust pipe 106, a lower portion 111 with a circular area of passage S2 defined by the inner wall of the lower portion 103A of the piping system said lower portion 111 extending below the lower opening 108 of the pipe 106, and an intermediate portion 112 extending between the lower and upper portions 111, 110, said intermediate portion having a substantially annular area of passage S3 defined between the inner wall of the lower portion 103A of the piping system and the outer wall of the gas exhaust pipe 106.

The area of passage S2 is advantageously comprised between 1.05 to 1.5 times the area of passage S1, while the area of passage S3 is greater than S1, for example equal to 1.01 to 1.1 times S1.

The pipe 106 has an area of passage for as which corresponds to substantially 0.1 to 0.5 times S2. A larger area of passage is possible for the pipe 106. The pipe 106 enables the exhaust of gas released during the at least partial defoaming of foam inside the piping system 101, especially at the place of its enlargement (portion 111), whereby increasing the efficiency of the recycling of foam and components issued from said foam into the liquid bath.

Rods 120 are used for adapting the position of the funnel shaped extension 104, said rods acting moreover as means for breaking the foam flowing into said extension 104.

Said embodiment has the following advantages:

by using the helix blade turbine or impeller, greater sucking forces are induced in several directions, especially in directions enabling a good suction and a good distribution and movement in the liquid bath.

The adjustment of the upper portion 103B with respect to the lower portion 103A is carried out by simple sliding movement, whereby the position of the upper edge of the funnel shaped extension 104 can be precisely adapted in function of the height of the foam layer and whereby the position of the impeller in the bath under the liquid level is substantially not modified.

Figure 20:
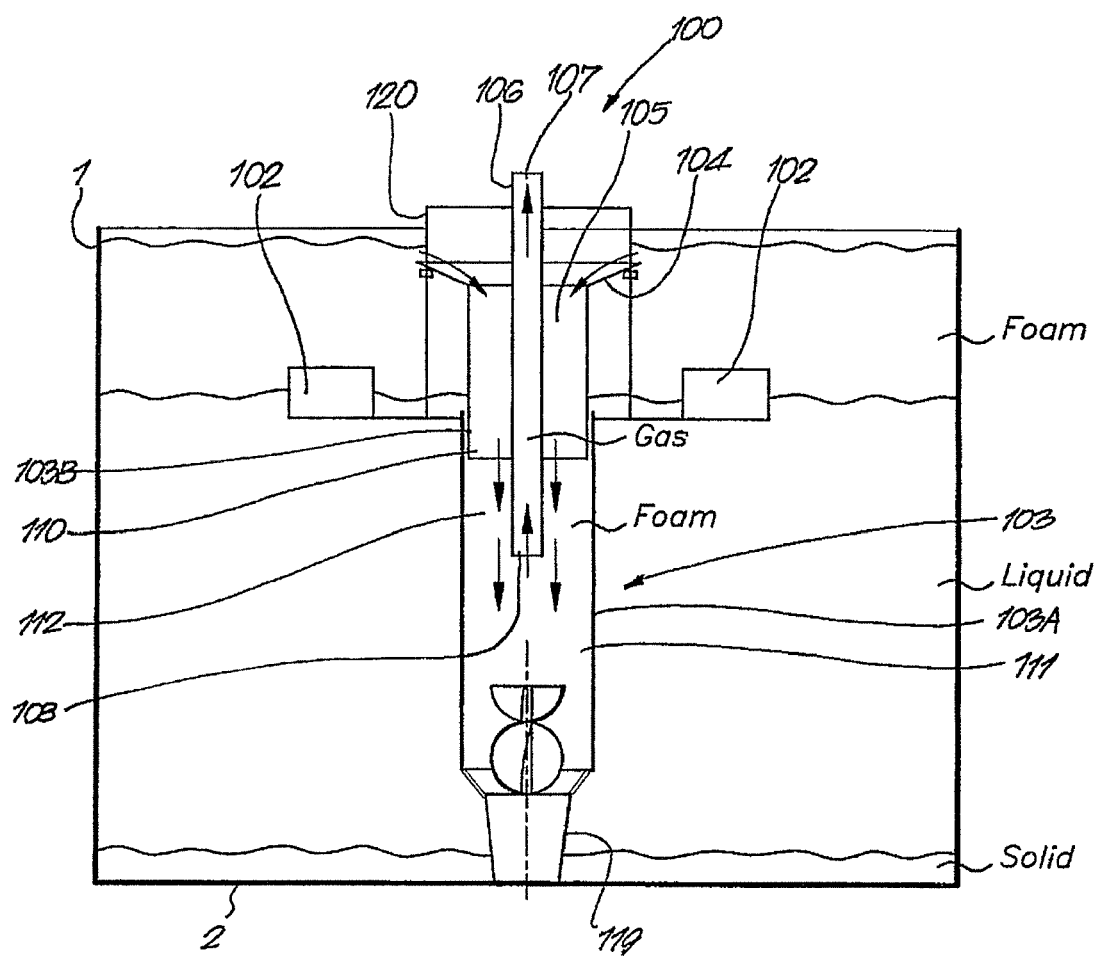
FIG. 20 is a view of the foam breaking equipment of FIG. 19 with adapted piping system.

FIG. 20 shows the foam breaking equipment 100 with the upper portion 103B in an upwards position with respect to its position in FIG. 19.

The systems, equipment, installations of the invention can be used for various treatments, such as treatments of manure waste, animal liquid manure, industrial liquid waste, water treatment system, lagoons, liquid waste issuing from the food industry, liquid with foam formed by saponification reactions, etc.

In the system of the invention, the working of the foam breaking equipment can be controlled in function of several parameters, such as thickness of the foam layer, upper level of the liquid layer, oxygenation level, biodegradation, temperature, structure of the foam, etc. For example, such a control can be controlled by a computer system receiving signal(s) from one or more sensors.

The speed of the impeller or sucking means can be controlled, for example in function of the agitation required for ensuring a good breaking of the foam and its good dispersion in the liquid, for ensuring a good suction of the foam (for example in function of its density and structure, in function of the distance between the top level of the foam layer with respect to the position of the sucking means), etc.

The foam breaking equipment unit can also be controlled so as to suck and break foam from a specific zone. For example, only the top layer of the foam is suck and treated. For said purposes, a foam overflow system can be used, said foam overflow system enabling only the top foam layer above a specific level to flow in the foam breaking equipment unit. Said specific overflow level can be controlled, automatically or not, in function of various parameters, such as foam density, foam thickness, minimum/maximum admissible foam flow rates, etc.

Such a control can be carried out by a computer, for example acting on the rod or driving the rod 120 so as to move upwardly or downwardly the funnel shaped element 104.

In the system, especially the foam breaking equipment of the invention, the length of the conveying means as well as the position of the element 106 in said conveying means can also be controlled. Such a control is for example carried out in function of the defoaming zone of the foam in the conveying means or the upper level at which a sufficient defoaming of the foam starts.

Figure 21:
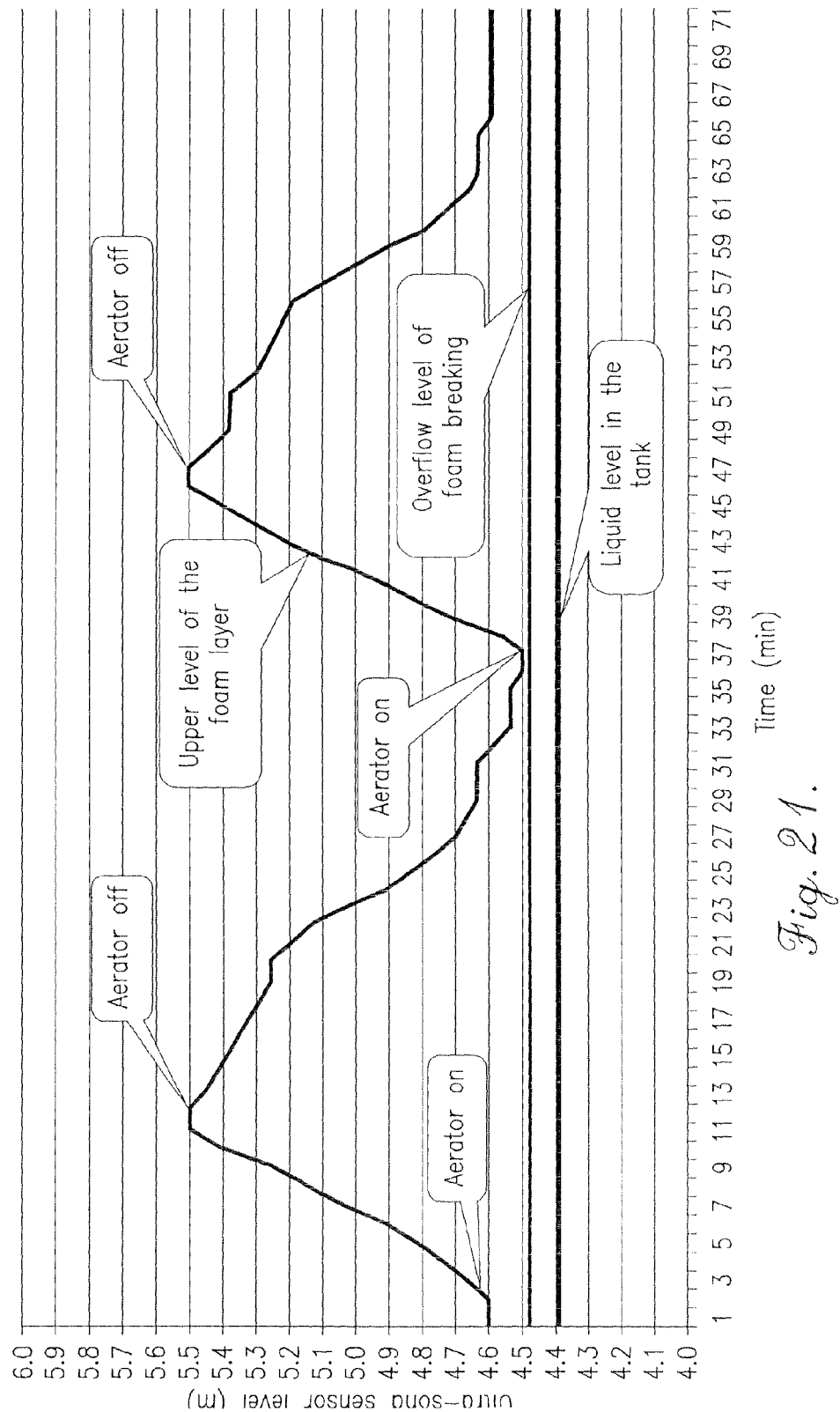
FIG. 21 is a graph giving the evolution of the foam layer level by using a foam breaking equipment of the invention.

FIG. 21 shows the evolution of the foam level in a tank in which a liquid medium is submitted to an intense aeration. Said intense aeration causes the formation of a high volume of foam, although the foam breaking equipment of FIG. 19 is working. When the aerator is active, the foam level increases rapidly from the level 4.6 m to 5.5 m, i.e. increase of 90 cm foam height in about 9 minutes. When the height of 5.5 m is reached, the working of the aerator is stopped, in order to avoid a foam overflow outside of the tank.

Due to the working of the foam breaking equipment of the invention, the foam height decreases rapidly to a level of less than 4.7 m (in less than 20 minutes), whereby enabling a new intense aeration step.

By using the foam breaking equipment of the invention, it is thus possible to have two intense aeration steps of about 10 minutes per hours, meaning a good and effective treatment. The foam breaking equipment of the invention thus enables an improvement in the treatment of the liquid contained in the tank, as well as of the compounds forming the envelope of the foam bubbles.

Figure 22:
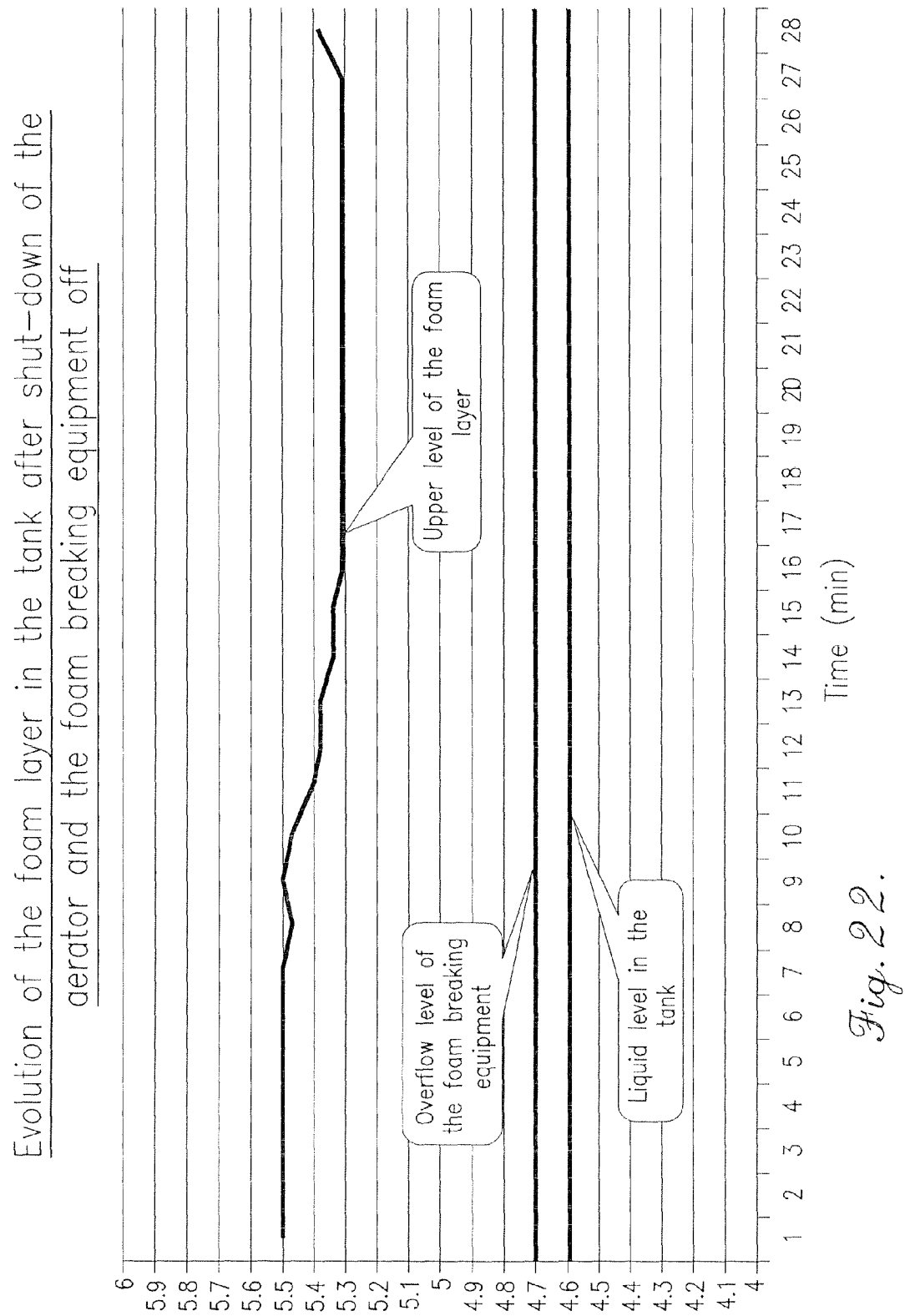
FIG. 22 is a graph giving the evolution of the foam layer in the tank with no working of the foam breaking equipment of the invention.

When not using the foam breaking equipment of the invention (foam breaking equipment off), the increase of the foam height was even more rapid, while after the shut down of the aerator when reaching the level 5.5 m, the decrease of foam level was extremely slow (FIG. 22). After one hour, it was still not possible to reach the level 5.2 m. It means thus that in case a further aeration step has to be carried out said aeration step has not to be very intense and will have to be stopped extremely rapidly, meaning a low efficiency of the treatment.

What we claim is:

1. A foam breaking equipment for a system adapted for treating a liquid medium volume with floating foam, said liquid medium volume and said floating foam being contained in a tank having a bottom portion and an upper portion, whereby said foam breaking equipment comprising:

a foam conveying means with a funnel shaped upper inlet adapted for the passage of floating foam and a downward outlet;

a sucking means comprising a screw shaped element adapted to be driven in rotation for creating a downwards suction of foam present in the foam conveying means from the funnel shaped upper inlet of the foam conveying means towards the sucking means, said sucking means being adapted for causing at least a partial defoaming of foam in the foam conveying means and for expelling foam through the outlet of the foam conveying means, whereby gas is released by said at least partial defoaming of foam in said foam conveying means, and at least a first exhaust gas tube defining a channel adapted for removing from the foam conveying means gas released by said at least partial defoaming, said first exhaust gas tube extending at least partly in the foam conveying means and having a first opening adapted to be located above the funnel shaped upper inlet and a second opening located in the foam conveying means at least 20 cm below the level of the funnel shaped upper inlet of the foam conveying means.

2. The foam breaking equipment of claim 1, in which the foam conveying means has a portion adjacent to the sucking means located below the second opening of the first exhaust gas tube, said portion having a section of passage for conveying foam towards the outlet of the foam conveying means, and in which the exhaust gas tube has a portion extending in the foam conveying means defining a channel with a surface of passage adapted for exhausting gas released by said at least partial defoaming of foam in the foam conveying means, whereby said surface of passage of said channel is comprised between 0.1 and 0.5 times the section of passage of said portion of the foam conveying means adjacent to the sucking means.

3. The foam breaking equipment of claim 1, in which the foam conveying means has a portion adjacent to the sucking means located below the second opening of the first exhaust gas tube, said portion having a section of passage for conveying foam towards the outlet of the foam conveying means, and in which the exhaust gas tube has a portion extending in the foam conveying means defining a channel with a surface of passage adapted for exhausting gas released by said at least partial defoaming of foam in the foam conveying means, whereby said surface of passage of said channel is comprised between 0.25 and 0.4 times the section of passage of said portion of the foam conveying means adjacent to the sucking means.

4. The foam breaking equipment of claim 1, in which the screw shaped element of the sucking means is a double helix element adapted to be driven in rotation for creating a downwards suction of foam present in the foam conveying means from the funnel shaped upper inlet of the foam conveying means towards the sucking means.

5. The foam breaking equipment of claim 1, in which the sucking means has a portion bearing the screw shaped element, whereby at least said portion with the screw shaped element is mounted movable with respect to the foam conveying means so as to adapt the relative position of the screw shaped element with respect to the foam conveying means.

6. The foam breaking equipment of claim 5, in which the sucking means has a portion bearing the screw shaped element, whereby at least said portion with the screw shaped element is mounted movable with respect to the foam conveying means so as to adapt the relative position of the screw shaped element with respect to an opening selected from the group consisting of the second opening of the first gas exhaust tube and the downwards outlet of the foam conveying means.

7. The foam breaking equipment of claim 1, in which the sucking means has a portion bearing the screw shaped element, whereby at least said portion with the screw shaped element is mounted on a support adapted for modifying the relative position of the screw shaped element with respect to the foam conveying means.

8. The foam breaking equipment of claim 7, in which the sucking means has a portion bearing the screw shaped element, whereby at least said portion with the screw shaped element is mounted on a support adapted for modifying the relative position of the screw shaped element with respect to an opening selected from the group consisting of the second opening of the first gas exhaust tube and the downwards outlet of the foam conveying means.

9. The foam breaking equipment of claim 1, in which the sucking means has a portion bearing the screw shaped element adapted to be driven in rotation so as to create a downwards foam flow in the foam conveying means towards the screw shaped element, whereby at least said portion with the screw shaped element is mounted movable with respect to the foam conveying means so as to adapt the relative position of the screw shaped element with respect to the foam conveying means for controlling said downwards foam flow in the foam conveying means.

10. The foam breaking equipment of claim 5, in which the sucking means has a portion bearing the screw shaped element adapted to be driven in rotation so as to create a downwards foam flow in the foam conveying means towards the screw shaped element, whereby at least said portion with the screw shaped element is mounted movable with respect to the foam conveying means so as to adapt the relative position of the screw shaped element with respect to an opening selected from the group consisting of the second opening of the first gas exhaust tube and the downwards outlet of the foam conveying means, for controlling said downwards foam flow in the foam conveying means.

11. The foam breaking equipment of claim 1, in which the exhaust gas tube has a portion extending in the foam conveying means, said portion having a length from 20 to 200 cm.

12. The foam breaking equipment of claim 1, in which the exhaust gas tube has a portion extending in the foam conveying means, said portion having a length from 20 to 100 cm.

13. The foam breaking equipment of claim 1, in which the funnel shaped upper inlet of the foam conveying means is located at a first level, while the sucking means is located at a second level located below said first level of the funnel shaped upper inlet of the foam conveying means, whereby a distance of at least 40 cm separated said second level from said first level.

14. The foam breaking equipment of claim 1, in which the funnel shaped upper inlet of the foam conveying means is located at a first level, while the sucking means is located at a second level located below said first level of the funnel shaped upper inlet of the foam conveying means, whereby a distance of at least 100 cm separated said second level from said first level.

15. The foam breaking equipment of claim 1, in which the funnel shaped upper inlet of the foam conveying means is located at a first level, while the sucking means is located at a second level located below said first level of the funnel shaped upper inlet of the foam conveying means, whereby a distance of at least 150 cm separated said second level from said first level.

16. The foam breaking equipment of claim 1, in which the second opening of the first gas exhaust tube is located at a first level, while the sucking means is located at a second level located below said first level of said second opening, whereby a distance of less than 50 cm separates said second level from said first level.

17. The foam breaking equipment of claim 1, in which the second opening of the first gas exhaust tube is located at a first level, while the sucking means is located at a second level located below said first level of said second opening, whereby a distance of comprised between 1 mm and 25 cm separates said second level from said first level.

18. The foam breaking equipment of claim 1, in which the foam conveying means has a lower portion adjacent to the outlet of the foam conveying means, whereby the sucking means is selected from the group consisting of sucking means adapted for being adjacent to the bottom of the tank, while being adjacent to said lower portion of the foam conveying means, and sucking means attached to the foam conveying means so as to extend adjacent to the lower portion of said foam conveying means.

19. The foam breaking equipment of claim 1, in which the foam conveying means comprises a first upper portion in which the first gas exhaust tube extends and a second lower portion in which said first gas exhaust tube does not extend, whereby adjacent to the second lower portion of the foam conveying means, a first surface of passage for conveying foam in the foam conveying means is defined in the first upper portion, while adjacent to the first upper portion of the foam conveying means, a second surface of passage for conveying foam in the foam conveying means towards the sucking means is defined in the second lower portion, whereby said second surface of passage is larger than the said first surface of passage.

20. The foam breaking equipment of claim 1, in which the foam conveying means comprises a first upper portion in which the first gas exhaust tube extends and a second lower portion in which said first gas exhaust tube does not extend, whereby adjacent to the second lower portion of the foam conveying means, a first surface of passage for conveying foam in the foam conveying means is defined in the first upper portion, while adjacent to the first upper portion of the foam conveying means, a second surface of passage for conveying foam in the foam conveying means towards the sucking means is defined in the second lower portion, whereby said second surface of passage is comprised between 1.1 and 3 times the said first surface of passage.

21. The foam breaking equipment of claim 1, which comprises a means adapted for admitting a gas in the foam conveying means below the funnel shaped inlet.

22. The foam breaking equipment of claim 1, which comprises a means adapted for admitting a gas in the foam conveying means in the neighborhood of the screw shaped element.

23. The foam breaking equipment of claim 1, in which the foam conveying means is provided adjacent to the funnel shaped inlet with a means selected from the group consisting of means adapted for breaking foam extending above the funnel shaped upper inlet, means adapted for breaking foam extending in front of the funnel shaped upper inlet, means adapted for breaking foam in the foam conveying means adjacent to the funnel shaped upper inlet, means adapted for disturbing foam extending above the funnel shaped upper inlet, means adapted for disturbing foam extending in front of the funnel shaped upper inlet, means adapted for disturbing foam in the foam conveying means adjacent to the funnel shaped upper inlet, and combinations thereof.

24. The foam breaking equipment of claim 1, in which the foam conveying means comprises a wall adapted to define in the tank containing said liquid medium volume with floating foam a chamber, said chamber being adapted for communicating with the floating foam substantially only via the funnel shaped upper inlet and with the liquid medium volume via the downward outlet of the foam conveying means, and in which the foam breaking equipment further comprises at least one means adapted for conducting at least one chemical additive or reactive in the chamber defined by the wall of the foam conveying means.

25. The foam breaking equipment of claim 1, in which at least a portion of the foam conveying means is adapted for being mobile with respect to the tank containing the aqueous medium with floating foam, so as to control at least the position of said portion with respect to the tank.

26. The foam breaking equipment of claim 25, in which the foam conveying means comprises at least a lower portion and an upper portion, the upper portion being at least adapted for being mobile with respect to the tank.

27. The foam breaking equipment of claim 26, which comprises at least a floating element on which the upper portion of the foam conveying means is mounted.

28. The foam breaking equipment of claim 1, which comprises a driving motor for driving into rotation the screw shaped element, said driving motor being selected from the group consisting of driving motors suitable to be immerged in the liquid and driving motors suitable to located above the liquid level.

29. The foam breaking equipment of claim 1, in which the foam conveying means comprises two portions mobile the one with respect to the other.

30. The foam breaking equipment of claim 29, in which the foam conveying means comprises an upper portion provided with the funnel shaped upper inlet, a lower portion and at least one means for adjusting the position of the upper portion with respect to the lower portion and for maintaining said position.

31. The foam breaking equipment of claim 30, in which, in the neighborhood of the lower portion, the upper portion in which the gas exhaust tube extends has a first surface of passage for conveying foam towards the lower portion, while in the neighborhood of the sucking means, the lower portion has a second surface of passage for conveying foam towards the sucking means, whereby the second surface of passage is comprised between 1.05 and 5 times the first surface of passage.

32. The foam breaking equipment of claim 1, in which the foam conveying means comprises an upper portion and a lower portion mobile the one with respect to the other, and in which the upper portion has at least one wall defining an extension partly engaged in a channel formed by at least one wall of the lower portion, whereby between the wall of the extension of the upper portion and the wall of the channel of the lower portion, at least one channel adapted for the passage of liquid from the liquid medium volume contained in the tank.

33. The foam breaking equipment of claim 32, in which the channel of the lower portion comprises at least a first part in which the extension of the upper portion is engaged and in which the first gas exhaust tube extends, and a second part adjacent to the sucking means in which the first gas exhaust tube does not extend, said first part having a first surface of passage for conveying foam towards the second part, while the second part has a second surface of passage for conveying foam towards the sucking means, whereby the second surface of passage is comprised between 1.05 and 5 times the first surface of passage.

34. The foam breaking equipment of claim 33, in which the second surface of passage is comprised between 1.2 and 2 times the first surface of passage.

35. The foam breaking equipment of claim 1, which comprises a means adapted for controlling the pressure in the foam conveying means.

36. The foam breaking equipment of claim 1, in which the sucking means and the foam conveying means are adapted for recirculating foam into the liquid volume after its partial defoaming.

37. A treatment installation comprising at least one tank adapted for containing a liquid medium with floating foam, and a foam breaking equipment, said foam breaking equipment comprising:

a foam conveying means with a funnel shaped upper inlet adapted for the passage of floating foam and a downward outlet;

a sucking means comprising a screw shaped element adapted to be driven in rotation for creating a downwards suction of foam present in the foam conveying means from the funnel shaped upper inlet of the foam conveying means towards the sucking means, said sucking means being adapted for causing at least a partial defoaming of foam in the foam conveying means and for expelling foam through the outlet of the foam conveying means, whereby gas is released by said at least partial defoaming of foam in said foam conveying means, and at least a first exhaust gas tube defining a channel adapted for removing from the foam conveying means gas released by said at least partial defoaming, said first exhaust gas tube extending at least partly in the foam conveying means and having a first opening adapted to be located above the funnel shaped upper inlet and a second opening located in the foam conveying means at least 20 cm below the level of the funnel shaped upper inlet of the foam conveying means.

38. The treatment installation of claim 37, in which the foam conveying means has a portion adjacent to the sucking means located below the second opening of the first exhaust gas tube, said portion having a section of passage for conveying foam towards the outlet of the foam conveying means, and in which the exhaust gas tube has a portion extending in the foam conveying means defining a channel with a surface of passage adapted for exhausting gas released by said at least partial defoaming of foam in the foam conveying means, whereby said surface of passage of said channel is comprised between 0.1 and 0.5 times the section of passage of said portion of the foam conveying means adjacent to the sucking means.

39. The treatment installation of claim 37, in which in which the screw shaped element of the sucking means is a double helix element adapted to be driven in rotation for creating a downwards suction of foam present in the foam conveying means from the funnel shaped upper inlet of the foam conveying means towards the sucking means.

40. The treatment installation of claim 37, in which the sucking means has a portion bearing the screw shaped element, whereby at least said portion with the screw shaped element is mounted movable with respect to the foam conveying means so as to adapt the relative position of the screw shaped element with respect to the foam conveying means.

41. The treatment installation of claim 37, in which the funnel shaped upper inlet of the foam conveying means is located at a first level, while the sucking means is located at a second level located below said first level of the funnel shaped upper inlet of the foam conveying means, whereby a distance of at least 40 cm separated said second level from said first level.

42. The treatment installation of claim 37, in which the second opening of the first gas exhaust tube is located at a first level, while the sucking means is located at a second level located below said first level of said second opening, whereby a distance of less than 50 cm separates said second level from said first level.

43. The treatment installation of claim 37, in which the foam conveying means comprises a first upper portion in which the first gas exhaust tube extends and a second lower portion in which said first gas exhaust tube does not extend, whereby adjacent to the second lower portion of the foam conveying means, a first surface of passage for conveying foam in the foam conveying means is defined in the first upper portion, while adjacent to the first upper portion of the foam conveying means, a second surface of passage for conveying foam in the foam conveying means towards the sucking means is defined in the second lower portion, whereby said second surface of passage is comprised between 1.1 and 3 times the said first surface of passage.

44. The treatment installation of claim 37, in which at least a portion of the foam conveying means is adapted for being mobile with respect to the tank containing the aqueous medium with floating foam, so as to control at least the position of said portion with respect to the tank.

45. The treatment installation of claim 44, in which the foam conveying means comprises at least a lower portion and an upper portion, the upper portion being at least adapted for being mobile with respect to the tank.

46. The treatment installation of claim 45, which comprises at least a floating element on which the upper portion of the foam conveying means is mounted.

47. The treatment installation of claim 37, in which the foam conveying means comprises an upper portion provided with the funnel shaped upper inlet, a lower portion and at least one means for adjusting the position of the upper portion with respect to the lower portion and for maintaining said position.

48. The treatment installation of claim 37, in which the foam conveying means comprises an upper portion and a lower portion mobile the one with respect to the other, and in which the upper portion has at least one wall defining an extension partly engaged in a channel formed by at least one wall of the lower portion, whereby between the wall of the extension of the upper portion and the wall of the channel of the lower portion, at least one channel adapted for the passage of liquid from the liquid medium volume contained in the tank.

49. The treatment installation of claim 37, in which the sucking means and the foam conveying means are adapted for recirculating foam into the liquid volume of the tank.

50. The treatment installation of claim 37, which comprises a further tank, whereby the sucking means and the foam conveying means are adapted for conveying foam towards said further tank.

51. The treatment installation of claim 37, which further comprises at least one aerator.

52. A process for breaking foam floating on a liquid medium contained in a first tank in which floating foam is broken in foam breaking equipment, comprising the steps of:
   providing a foam conveying means within said first tank, said foam conveying means having a funnel shaped upper inlet adapted for the passage of floating foam and a downward outlet, a sucking means operatively connected to the foam conveying means and having a screw-shaped element adapted to be rotatably driven;
   providing a first exhaust gas tube defining a channel, said first exhaust gas tube being positioned relative to said foam conveying means for conveying gas from the foam conveying means, said first exhaust gas further having a first opening located above the funnel shaped upper inlet and a second opening located in the foam conveying means at least 20 cm below the level of the funnel shaped upper inlet of the foam conveying means;
   rotating said screw-shaped element to suck foam downwardly into the funnel-shaped upper inlet;
   conveying foam downwardly through said funnel-shaped upper inlet towards the sucking means;
   at least partially defoaming the foam conveyed into the foam conveying means;
   conveying gas released from the foam in the defoaming step into said channel of said first exhaust gas tube; and
   conveying foam which remains after passage through the foam conveying means to one of said first tank and a second tank different from said first tank.

53. The process of claim 52, in which the liquid medium is aerated, while foam is broken into the foam breaking equipment.

54. The process of claim 53, in which the liquid medium is intermittently aerated, an aeration step being stopped when the foam in the tank reach an upper level, while an aeration step is started back when the foam in the tank is below an admissible foam level.

* * * * *